(12) United States Patent
Frazer et al.

(10) Patent No.: US 11,428,115 B2
(45) Date of Patent: Aug. 30, 2022

(54) CONTROL OF ROTOR STRESS WITHIN TURBOMACHINE DURING STARTUP OPERATION

(71) Applicant: General Electric Company, Schenectady, NY (US)

(72) Inventors: Austin Daniel Frazer, Glenville, NY (US); Dean Alexander Baker, Clifton Park, NY (US); Steven Di Palma, Ballston Lake, NY (US); Carl Raymond Toth, Clifton Park, NY (US); Bruce Frederick Nagel, Nassau, NY (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 17/032,645

(22) Filed: Sep. 25, 2020

(65) Prior Publication Data
US 2022/0098996 A1   Mar. 31, 2022

(51) Int. Cl.
*F01D 19/02* (2006.01)
*F01K 13/02* (2006.01)
*F01K 23/10* (2006.01)

(52) U.S. Cl.
CPC ............. *F01D 19/02* (2013.01); *F01K 13/02* (2013.01); *F01K 23/10* (2013.01);
(Continued)

(58) Field of Classification Search
CPC .......... F01D 19/00; F01D 19/02; F01D 25/10; F01K 13/02; F01K 23/10; F05D 2220/31;
(Continued)

(56) References Cited

U.S. PATENT DOCUMENTS 4,357,803 A   11/1982  Dickenson
4,957,410 A    9/1990  Silvestri, Jr.
(Continued)

FOREIGN PATENT DOCUMENTS

EP     1797284 A1    6/2007
EP     3168434 A1    5/2017
JP     H09317404 A   12/1997

OTHER PUBLICATIONS

European Search Report for corresponding EP Application No. 21197559.4 dated Feb. 15, 2022, 5 pages.

*Primary Examiner* — Jesse S Bogue
(74) *Attorney, Agent, or Firm* — James Pemrick; Charlotte Wilson; Hoffman Warnick LLC

(57) ABSTRACT

Embodiments of the disclosure provide a method for controlling steam pressure within a turbine component. The method includes calculating a predicted stress on a rotor of the turbine component based on a predicted steam flow with the inlet valve in a minimum load position, a rotor surface temperature, and an inlet steam temperature, and determining whether the predicted stress exceeds a threshold. If the predicted stress exceeds the threshold, the inlet valve adjusts to a warming position. When steam in the discharge passage reaches a target pressure, the exhaust valve partially closes while maintaining the warming position of the inlet valve. If a safety parameter of the turbine component violates a boundary, the exhaust valve partially opens while maintaining the warming position of the inlet valve. When the predicted stress does not exceed the threshold, the inlet valve opens to at least the minimum load position.

20 Claims, 5 Drawing Sheets

(52) U.S. Cl.
CPC ...... *F05D 2220/31* (2013.01); *F05D 2260/81* (2013.01); *F05D 2270/303* (2013.01); *F05D 2270/3013* (2013.01); *F05D 2270/331* (2013.01); *F05D 2270/332* (2013.01); *F05D 2270/44* (2013.01)

(58) Field of Classification Search
CPC ............ F05D 2260/81; F05D 2260/85; F05D 2270/3013; F05D 2270/303; F05D 2270/331; F05D 2270/332; F05D 2270/44
See application file for complete search history.

(56) References Cited

U.S. PATENT DOCUMENTS

| | | | |
|---|---|---|---|
| 7,621,133 B2 | 11/2009 | Tomlinson et al. | |
| 7,765,807 B2 | 8/2010 | Diesterbeck et al. | |
| 7,980,053 B2 * | 7/2011 | Yakushi | F01D 17/00 |
| | | | 60/656 |
| 10,100,679 B2 * | 10/2018 | Geveci | F01K 7/165 |
| 10,781,723 B2 * | 9/2020 | Rao | F02C 6/18 |
| 2005/0085949 A1 * | 4/2005 | Kirchhof | F01K 7/165 |
| | | | 60/660 |
| 2011/0146276 A1 * | 6/2011 | Sathyanarayana | F01K 13/02 |
| | | | 60/660 |
| 2014/0165565 A1 | 6/2014 | Shindo | |
| 2017/0002692 A1 * | 1/2017 | Cheng | F01K 13/02 |
| 2017/0241285 A1 * | 8/2017 | Bennauer | F01D 21/003 |
| 2019/0072006 A1 * | 3/2019 | Duffy | F01K 23/101 |

* cited by examiner

CONTROL OF ROTOR STRESS WITHIN TURBOMACHINE DURING STARTUP OPERATION

BACKGROUND

The disclosure relates generally to the operation of turbomachinery. More specifically, embodiments of the disclosure provide a methodology for controlling rotor stress within portions of a turbine system during a startup operation where a turbomachine may experience backpressure on or within a turbine element.

Power generation systems, also known as power plants, typically include a variety of different systems (e.g., turbomachine, generator, and/or other interconnected assemblies) that are used to generate a power output. Such power plants may include a power source (e.g., a turbomachine, solar panel, nuclear reactor, etc.), a prime mover (e.g., a rotatable shaft or similar element) for coupling the power source to an electric generator, and/or various components of the electric generator. For instance, a power generation system may include a gas turbine assembly having a compressor coupled to a gas turbine. The gas turbine in turn may be coupled to and drive a generator mounted on the same shaft. The generator produces a power output.

Power generation systems typically include a variety of different turbomachines and/or systems that are used to generate a power output. Examples of such power systems may include gas turbine systems and/or combined cycle power plants, which typically include one or more gas turbine systems. Conventional combined cycle power plants employ one or multiple gas turbine systems operatively coupled to one or multiple steam turbine systems. The gas turbine system includes a compressor coupled to a gas turbine. The gas turbine is usually coupled to and drives an external component, such as a generator, for producing a load or power output. The steam turbine system typically includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator).

In a typical combined cycle power plant, exhaust gas from the gas turbine is passed to a heat recovery steam generator (HRSG), which may be used to reheat and provide steam to the various turbine sections of the steam turbine system for enhanced efficiency of the system and/or power plant. Downstream of the HRSG the exhaust gas is released to the atmosphere through a stack. A technical challenge associated with steam turbine (ST) operation is assuring safe, reliable operation of the steam turbine components during startup, and maintaining various parameters within their targeted boundaries. Increases in temperature and pressure from their non-operational values throughout the turbine may affect the health and lifespan of ST components, in addition to affecting the power output from the ST system.

BRIEF DESCRIPTION

Aspects of the disclosure provide a method for controlling steam pressure within a turbine component during a startup operation, the turbine component being fluidly coupled between an inlet having an inlet valve for controlling steam flow into the turbine component and an exhaust having an exhaust valve for controlling steam flow to a discharge passage, the method including: adjusting the exhaust valve to a fully open position and the inlet valve to a fully closed position; calculating a predicted stress on a rotor of the turbine component based on a predicted steam flow with the inlet valve in a minimum load position, a rotor surface temperature, and an inlet steam temperature; determining whether the predicted stress exceeds a threshold; in response to the predicted stress exceeding the threshold, adjusting the inlet valve to a warming position that is less open than the minimum load position, such that a steam flow through the turbine component pressurizes the discharge passage; in response to steam in the discharge passage reaching a target pressure, partially closing the exhaust valve while maintaining the warming position of the inlet valve; determining whether a safety parameter of the turbine component violates a boundary, while maintaining the warming position of the inlet valve; in response to the safety parameter of the turbine component violating the boundary, partially opening the exhaust valve while maintaining the warming position of the inlet valve; recalculating the predicted stress on the rotor with the inlet valve in the warming position; and in response to the predicted stress not exceeding the threshold, opening the inlet valve to at least the minimum load position.

Further aspects of the disclosure provide a program product stored on a computer readable storage medium for controlling steam pressure within a turbine component during a startup operation, the turbine component being fluidly coupled between an inlet having an inlet valve for controlling steam flow into the turbine component and an exhaust having an exhaust valve for controlling steam flow to a discharge passage, the computer readable storage medium comprising program code for causing a computer system to perform actions including: adjusting the exhaust valve to a fully open position and the inlet valve to a fully closed position; calculating a predicted stress on a rotor of the turbine component based on a predicted steam flow with the inlet valve in a minimum load position, a rotor surface temperature, and an inlet steam temperature; determining whether the predicted stress exceeds a threshold; in response to the predicted stress exceeding the threshold, adjusting the inlet valve to a warming position that is less open than the minimum load position, such that a steam flow through the turbine component pressurizes the discharge passage; in response to steam in the discharge passage reaching a target pressure, partially closing the exhaust valve while maintaining the warming position of the inlet valve; determining whether a safety parameter of the turbine component violates a boundary, while maintaining the warming position of the inlet valve; in response to the safety parameter of the turbine component violating the boundary, partially opening the exhaust valve while maintaining the warming position of the inlet valve; recalculating the predicted stress on the rotor with the inlet valve in the warming position; and in response to the predicted stress not exceeding the threshold, opening the inlet valve to at least the minimum load position.

Additional aspects of the disclosure provide a turbine system including: a turbine component fluidly coupled between an inlet having an inlet valve for controlling steam flow into the turbine component and an exhaust having an exhaust valve for controlling steam flow to a discharge passage; a control system operatively coupled to the inlet valve and the exhaust valve of the turbine component, wherein the control system performs actions including: adjust the exhaust valve to a fully open position and the inlet valve to a fully closed position; calculate a predicted stress on a rotor of the turbine component based on a predicted steam flow with the inlet valve in a minimum load position, a rotor surface temperature, and an inlet steam temperature;

determine whether the predicted stress exceeds a threshold; in response to the predicted stress exceeding the threshold, adjust the inlet valve to a warming position that is less open than the minimum load position, such that a steam flow through the turbine component pressurizes the discharge passage; in response to steam in the discharge passage reaching a target pressure, partially close the exhaust valve while maintaining the warming position of the inlet valve; determine whether a safety parameter of the turbine component violates a boundary, while maintaining the warming position of the inlet valve; in response to the safety parameter of the turbine component violating the boundary, partially open the exhaust valve while maintaining the warming position of the inlet valve; recalculate the predicted stress on the rotor with the inlet valve in the warming position; and in response to the predicted stress not exceeding the threshold, open the inlet valve to at least the minimum load position.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
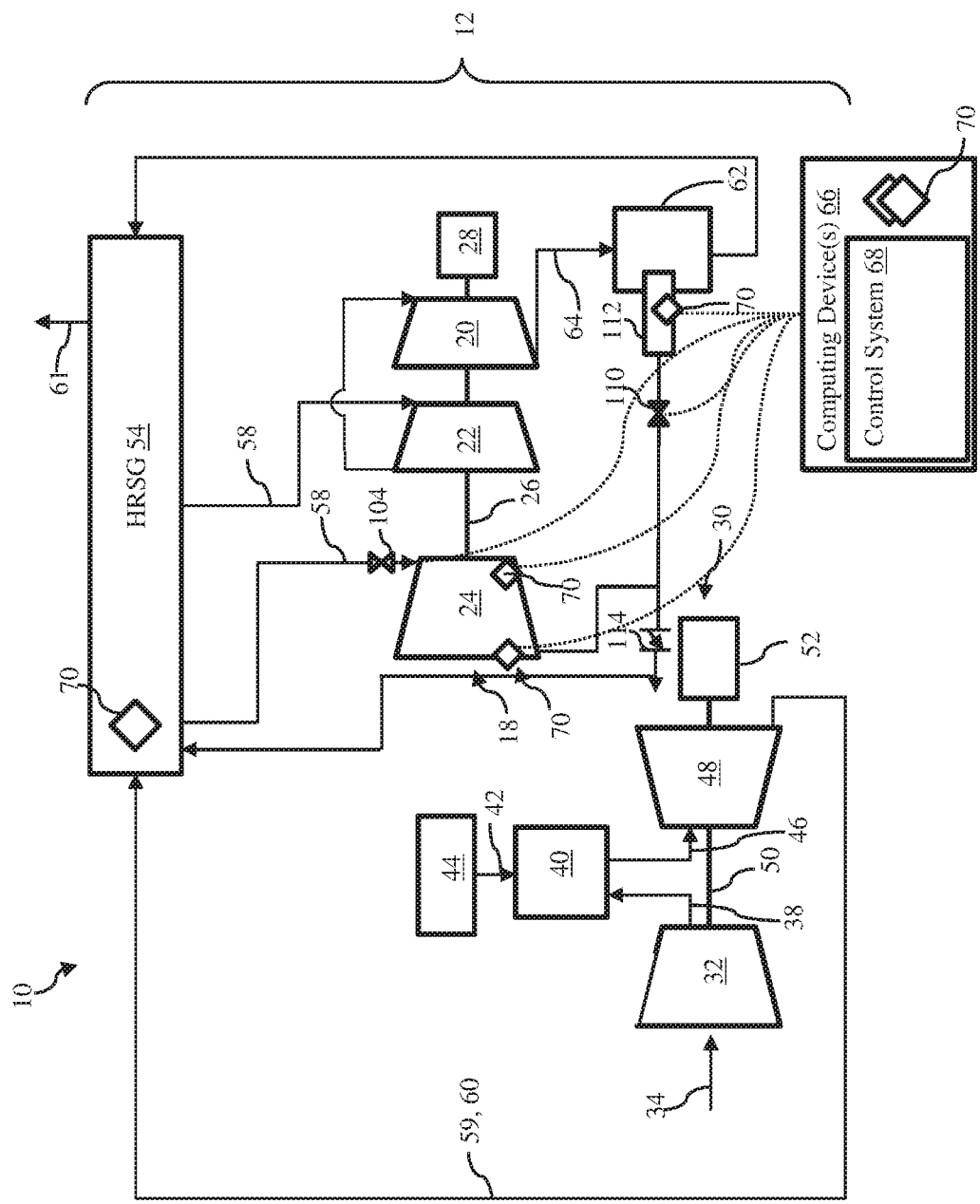
FIG. 1 is a schematic view of a control system, combined cycle power generation system, and other components configured for use in methods, according to embodiments of the disclosure.

As an initial matter, in order to clearly describe the current technology, it will become necessary to select certain terminology when referring to and describing relevant machine components within the various systems, components, and other embodiments of the disclosure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the present disclosure provide methods, program products, and systems for controlling rotor stress within portions of a turbomachine. According to one example, the disclosure may be effective for managing a high pressure (HP) component of a steam turbine (ST) system during a startup operation. In such an example, the disclosure provides a methodology for operating ST systems having an HP component fluidly coupled between an inlet having an inlet valve for controlling steam flow into the HP component, and an exhaust having an exhaust valve for controlling steam flow from the HP component into a condenser. During a startup operation, steam may flow through the intermediate pressure (IP) and/or low pressure (LP) sections of the ST system until conditions are met to admit steam to the HP component. Embodiments of the disclosure predict the amount of stress that an initial steam flow would impart on the rotor. If the predicted stress is too high, the methodology may direct less than a minimum load steam flow to warm the turbine (e.g., within the HP component in an example) and pressurize fluidly interconnected components.

In embodiments of the disclosure, an operator of the turbomachine may initially adjust the exhaust valve to a fully open position and adjust the inlet valve to a fully closed position. In this state, no steam flows through a turbine component of the turbomachine but any existing fluids may pass through the exhaust valve. At this time, the method includes calculating a predicted stress on a rotor of the turbomachine. The "predicted stress" refers to the stress imparted on the rotor at the instant when a minimum operational steam flow begins passing through the turbine component. Thus, the predicted steam flow is based on the inlet valve being in a minimum load position, in addition to measured values of the rotor surface temperature and inlet steam temperature. In cases where the predicted stress exceeds a threshold value of stress (simply "threshold" hereafter), the inlet valve adjusts to a "warming position" that is less open than the minimum load position, but not completely closed. In this state, a steam flow pressurizes a discharge passage a condenser, and may drive rotation of the rotor and produce a power output. Once the steam in the discharge passage reaches a target pressure, the exhaust valve position is reduced while the inlet valve remains in the warming position. At this point, the turbine component begins to pressurize and the warming of the turbine element accelerates. During the warming of the turbine component, one or more safety parameters may be monitored and the exhaust valve may be partially opened to prevent violation of boundaries for the safety parameter(s). The predicted stress for the minimum load position is then recalculated, with the inlet valve still in the warming position, until it goes below the threshold. Once the predicted stress is less than the threshold, the inlet valve opens to at least the minimum load position and the exhaust valve fully closes. In some embodiments, the resulting stress on the rotor is input to a predictive model, which adjusts future calculations of predicted stress. These adjusted calculations of predicted stress may influence the opening and closing of the inlet and exhaust valves in future startup operations.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 shows a schematic depiction of a system 10 according to various embodiments of the disclosure. In an example implementation, system 10 can include a combined cycle power generation system 12 (hereafter, "power generation system 12") including a steam turbine (ST) system 18, which in the depiction shown, can include a low pressure (LP) component 20, an intermediate pressure (IP) component 22 and a high pressure (HP) component 24, as is known in the art. LP component 20, IP component 22 and HP component 24 of ST system 18 may all be coupled and/or positioned on and/or may be configured to rotate a rotor 26 to produce mechanical work and/or to drive an additional component of ST system 18. The various components of system 10 need not be mounted on only one rotor 26, and may be mounted on and/or operatively coupled to multiple, respective rotors. As shown in FIG. 1, rotor 26 of ST system 18 may be coupled to and/or may drive an external component, and more specifically, a generator 28 configured to generate power and/or produce an electrical load. Although system 10 is shown and described as a combined cycle power generation system with multiple rotors and/or generators 28, 30, it is understood that system 10 may include only ST system 18, only one rotor 26, and/or any other currently known or later developed type of ST system and/or configuration.

Power generation system 12 can further include a gas turbine (GT) system 30. GT system 30 may include a compressor 32. Compressor 32 compresses an incoming flow of fluid 34 (e.g., air) as it flows through compressor 32. Compressor 32 may include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although power generation system 12 is shown in FIG. 1 to include a dual-shaft configuration where two separate generators 28, 52 are used, it is understood that in other non-limiting examples, ST system 18 and GT system 30 may share a single shaft and in turn, may share a single generator. Additionally, although power generation system 12 is shown to only include a single ST system 18 and single GT system 30, it is understood that power generation system 12 may include a plurality of ST systems 18 and/or GT system(s) 30 that may be configured to generate an operational load and/or power output.

Power generation system 12 can further include a heat recovery steam generator (HRSG) 54 fluidly connected with ST system 18 (e.g., with HP component 24, IP component 22 and/or LP component 20) and GT system 30. As shown in the non-limiting example of FIG. 1, HRSG 54 may be fluidly connected and/or coupled with ST system 18 to receive exhaust fluid (e.g., steam) from ST system 18, and may be coupled via supply conduits 58 to provide steam to the portions of ST system 18 via supply conduits 58. Additionally, in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power generation system 12.

Power generation system 12 can further include a condenser 62. Condenser 62 may be in fluid communication and/or may be fluidly coupled with various components of power generation system 12. In a non-limiting example, condenser 62 may be fluidly connected and/or coupled to LP component 24 of ST system 18 via steam exhaust duct 64. Condenser 62 may be configured to condense exhaust flow and/or bypass flow (not shown) from ST system 18 and/or HRSG 54, and providing a condensed fluid (e.g., condensate water) to HRSG 54, as is known in the art.

As shown in FIG. 1, system 10 can include at least one computing device 66 configured to control power generation system 12 during any phase of its operation, including a startup operation (i.e., the period between inactivity and operation at a targeted load, when the power output from ST system 18 is transient). Computing device(s) 66 can be hard-wired and/or wirelessly connected to and/or in communication with power generation system 12, and its various components (e.g., ST system 18, GT system 30, and/or HRSG 54, and so on) via any suitable electronic and/or mechanical communication component or technique. Computing device(s) 66, and its various components discussed herein, may be a single stand-alone system that functions separate from another power plant control system (e.g., computing device) (not shown) that may control and/or adjust operations and/or functions of power generation system 12, and its various components (e.g., ST system 18, GT system 30, and/or others). Alternatively, computing device(s) 66 and its components may be integrally formed within, in communication with and/or formed as a part of a larger power plant control system (not shown) that may control and/or adjust operations and/or functions of power generation system 12, and its various components (e.g., ST system 18, GT system 30, and/or others).

In various embodiments, computing device(s) 66 can include a control system 68 and one or more sensor(s) 70, as described herein, for controlling operations of power generation system 12. As discussed herein control system 68 can control power generation system 12, and its various components, to affect the operation of power generation system 12. For example, and as discussed herein, control system 68 may use various types of data and/or operational characteristics of HP component 24, and/or other components of system 10, determined by sensor(s) 70 to control the operation of system 10 and/or affect various attributes thereof. In some cases, control system 68 may generate and/or otherwise provide a predictive model (e.g., predictive model 244 shown in FIG. 3 and discussed elsewhere herein) which uses operating conditions and/or other characteristics of system 10 to predict how HP component 24 may respond to particular situations (e.g., it may predict stresses on rotor 26). Furthermore, embodiments of the present disclosure can adjust the predictive model based on, e.g., measurements obtained with sensor(s) 70. Embodiments of control system 68 may be configured or operated in part by a technician, computing device 66, and/or a combination of a technician and computing device 66. Where applicable, predictive model(s) of control 68 may include a biasing constant for deliberately overestimating a predicted stress on rotor 26. The biasing constant may take the form of, e.g., a multiplier, predetermined amount of stress to add to a preliminary calculation, and/or other mathematical modification to an initial output. In some implementations, embodiments of the disclosure may include changing the biasing constant (e.g., reducing it to reduce the amount of overestimation) in future startup operations to account for the behavior of system 10 under particular condition. The biasing constant may be calculated from data obtained using sensor(s) 70, pre-recorded data for multiple systems 10, and/or may be derived from these and/or other sources of data.

As shown in FIG. 1, computing device(s) 66 may include and/or may be in electrical and/or mechanical communication with sensor(s) 70, as well as many other additional and/or intermediate components such as valves, solenoids, actuators, converters, etc. (not shown) positioned throughout system 10. As shown in the non-limiting example of FIG. 1, and discussed herein, at least one sensor 70 of and/or connected to computing device(s) 66 may be positioned within HP component 24 and/or one or more of its various subcomponents as discussed elsewhere herein. Sensor(s) 70 in communication with computing device(s) 66 of system 10 may be any suitable sensor or device configured to detect and/or determine data, information, and/or operational characteristics relating to power generation system 12 during operation. For example, and as discussed herein, sensor(s) 70 positioned within HRSG 54 of power generation system 12 may be any suitable sensor configured to detect and/or determine the properties of a working fluid (e.g., steam, exhaust fluid 60). Such properties may include the working fluid temperature within portions and/or components of HP component 24, temperatures of turbine component(s) such as HP component 24 of ST system 18, and/or steam flow measurements of steam flowing through all or portions of a turbine such as HP component 24. In non-limiting examples, sensor(s) 70 may be configured as, but not limited to, thermometers, thermistor, thermocouples, and/or any other mechanical/electrical temperature sensors. In some cases, computing device 66 may aggregate multiple measurements (e.g., temperatures, pressures, etc.) for multiple portions of ST system 18 and/or its subcomponents to yield a temperature profile, pressure profile, stress profile, etc., for ST system 18 and/or any of its components (e.g., HP component 24)

Figure 2:
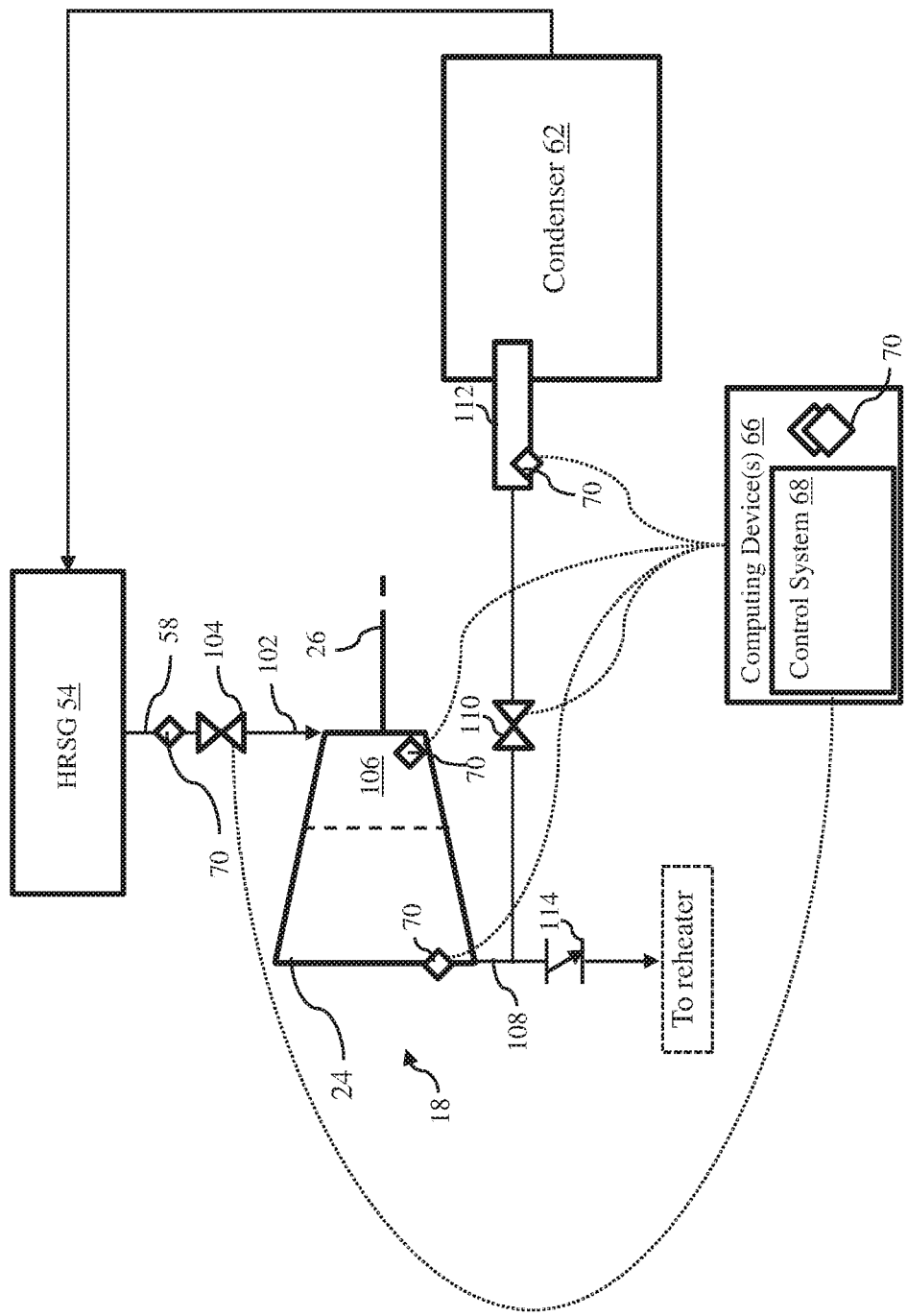
FIG. 2 is an expanded schematic view of a control system and portions of a turbomachine in the form of a steam turbine (ST) system according to embodiments of the disclosure.

Although two sensor(s) 70 are shown, it is understood that system 10 may include more sensor(s) 70 (e.g., as shown in FIG. 2) that may be configured to provide computing device(s) 66, and specifically control system 68, with information or data relating to the temperature of the fluids and components included within HP component 24, and/or fluid flow measurements. The number of sensor(s) 70 shown in FIG. 1 is merely illustrative and non-limiting. As such, system 10 may include more or fewer sensor(s) 70 than depicted in FIG. 1 or other figures.

FIG. 2 shows an expanded schematic view of HP component 24 and interconnected portions of system 10 shown in FIG. 1. Specifically, FIG. 2 shows a schematic view of HP component 24 together with its inlet connection from HRSG 54 and outlet connection to condenser 62. It is understood that similarly numbered and/or named components may function in a substantially similar fashion. Redundant explanation of these components, and illustration of other components within system 10, have been omitted solely for clarity.

FIG. 2 depicts HP component 24 of ST system 18, mounted on and mechanically coupled to a portion of rotor 26 as discussed elsewhere herein. A steam output from HRSG 54 may be in fluid communication with one supply conduit 58, which in turn is coupled to an inlet 102 to HP component 24 through an inlet valve 104. Inlet 102 can fluidly couple supply conduit 58 to a bowl 106 within HP component 24. Bowl 106 denotes an interior portion of HP component 24 that is upstream of energy-extracting elements (e.g., rotating blades), and thus is the highest-temperature and highest-pressure region within HP component 24 during operation. Steam may flow through HP component 24, where rotating blades therein extract heat energy from the steam before it is delivered to an outlet 108. Outlet 108 may include an outlet valve 110, which is adjustable to control the flow of fluids to a discharge passage 112 to condenser 62. Discharge passage 112 may take the form of any pressure-sensitive component for reducing steam pressure before it reaches condenser 62. According to an example, discharge passage 112 may take the form of a "dump tube," i.e., a mechanical assembly welded to a steam pipe downstream of outlet 108 that reduces steam pressure down to the pressure of a condenser. A non-return valve 114 may also be coupled to outlet 108, e.g., to route excess steam to a reheater or other heat transfer component (not shown). Non-return valve 114 may allow such excess steam to be directed from outlet 108 to reheat steam flows elsewhere in ST system 18 and/or HRSG 54. Non-return valve 114 may be configured such that any steam passing therethrough is unable to return to outlet 108 (e.g., from backpressure), and thus may be embodied as any currently known or later developed valve structure for permitting fluid flows in only one direction.

As shown in FIG. 2, and similarly discussed herein with respect to FIG. 1, computing device(s) 66, and more specifically, control system 68 of computing device(s) 66, may be operably coupled to and/or in electronic communication with various components of ST system 18. For example, computing device(s) 66, and more specifically, control system 68 of computing device(s) 66, may be operably coupled to and/or in electronic communication with valve(s) 104, 110 of ST system 18. Control system 68 of computing device(s) 66 may be configured to activate and/or control the operation of valve(s) 104, 110. Control system 68 may activate and/or control adjust the position of valve(s) 104, 110 for active control of steam flow through HP component 24 during operation of ST system 18, as discussed herein. Valve(s) 104, 110 may be adjusted between positions such as a fully open position, a fully closed position, and one or more partially-open positions. Such control of valve(s) 104, 110 with computing device(s) 66 and/or control system(s) 68, and/or similar features, may be implemented via mechanical couplings, electrical couplings, and/or converters (collectively denoted via phantom lines) between computing device 66 and valve(s) 104, 110. Adjusting the position of valve(s) 104, 110 as discussed herein may affect the temperature and pressure of steam within HP component 24 to control stresses on rotor 26 and/or other properties during a startup operation.

To help in the activation and/or control of valve(s) 104, 110, control system 68 may also use information obtained by sensor(s) 70 positioned within portions of ST system 18, and/or elsewhere in system 10 (FIG. 1). As discussed herein with respect to FIG. 1, system 10, including various portions of ST system 18, may include sensor(s) 70 of computing device(s) 66 positioned therein. In the non-limiting example shown in FIG. 2, sensor(s) 70 may be positioned within various portions of ST system 18 for obtaining a variety of information and/or operational characteristics for components of HRSG 54. For example, sensor(s) 70 may be positioned within supply conduit 58, bowl 106 of HP component 24, and/or outlet 108. Sensor(s) 70 additionally or alternatively may be positioned in other locations within ST system 18, e.g., on a surface of rotor 26, within other portions of HP component 24, within discharge passage 112, within inlet 102 to HP component 24, and/or any other location where a property (e.g., fluid temperatures, fluid pressures, surface temperatures, speed, etc.) is to be measured. Such sensor(s) 70 additionally or alternatively may be distributed throughout other components of system 10, e.g., HRSG 54, LP and/or IP components 20, 22 of ST system 18, generator 28, etc., to measure various properties (e.g., temperature, pressure, stress, etc.) of such components for use by control system 68.

As discussed herein, sensor(s) 70 positioned within system 10 (FIG. 1) and/or ST system 18 may be configured to detect and/or determine a fluid temperature, fluid pressure, mass flow, component temperature, component pressure, and/or other properties of components and/or fluid flow. In the non-limiting examples shown in FIG. 2, the various sensor(s) 70 positioned within HP component 24 and/or interconnected components may determine the properties of the steam or other properties (e.g., rotor 26 temperature) within ST system 18. That is, sensor(s) 70 may determine and/or detect the temperature, pressure, mass flow, etc., of fluids such as temperature of the steam at multiple locations as it flows from supply conduit 58 to inlet 102, through HP component 24, through outlet 108, and into discharge passage 112 and/or non-return valve 114. As noted elsewhere herein, sensor(s) 70 in non-limiting examples may be configured as, but not limited to, thermometers, thermistor, thermocouples, and/or any other mechanical/electrical temperature sensors. In various implementations, computing device 66 may express data from sensor(s) 70 in the form of a "profile" for ST system 18 and/or its components, i.e., values of temperature, stress, etc., indexed by sensor(s) where these values are measured.

Additionally in the non-limiting example, sensor(s) 70 may directly or indirectly measure a mass flow rate (e.g., volumetric flow in cubic meters per second) at the position where each sensor 70 is located. Additional sensor(s) 70 in communication with computing device(s) 66 may be configured to detect or determine a duration of operation of ST system 18 in a startup phase, measured relative to an initial state in which ST system 18 is inactive or in a dormant operating phase. The temperatures (e.g., steam, component), fluid flow measurement, and/or duration of operation detected by the various sensor(s) 70 positioned within ST system 18 may be provided to computing device(s) 66, and specifically control system 68. Using detected and/or measured temperatures, fluid flow measurement(s), duration of operation, etc., control system 68 may activate and/or adjust the operation or position of valve(s) 104, 110 to predict stress on rotor 26 and ensure that it is not too high when steam flow through HP component 24 is at its minimum load level, as discussed herein.

It is understood that the number of sensor(s) 70 shown in FIG. 2 as being positioned within ST system 18 is merely illustrative. As such, computing device(s) 66 may include more or fewer sensor(s) 70 positioned within ST system 18 to aid in the control of steam flow through HP component 24 as discussed herein. Additionally, although a portion of the plurality of sensor(s) 70 are not depicted to be in communication with computing device(s) 66, it is understood that all sensor(s) 70 shown in FIG. 2 are in communication with and/or are capable of providing detected-data relating to operational characteristics of components of ST system 18 to computing device(s) 66, as discussed herein. Furthermore, although computing device(s) 66, control system 68, and sensor(s) 70 are only shown in FIG. 2, it is understood that computing device(s) 66, control system 68, and sensor(s) 70 may be included in any of the non-limiting examples discuss herein.

The properties of ST system 18 operating in a start-up mode are generally discussed to further demonstrate their effects on and/or within HP component 24. During a start-up operation of power generation system 12, and specifically when HRSG 54 initially begins to generate steam, each component 20 (FIG. 1), 22 (FIG. 1), 24 may be at reduced or pre-start temperature (e.g., at least approximately thirty-eight degrees Celsius (° C.)/one-hundred degrees Fahrenheit (° F.), but will be immediately exposed to heated, high-temperature steam (generated with exhaust fluid 60) if steam flow into each component 20, 22, 24 is permitted. In this case, any components 20, 22, 24 that accept steam flow will experience a rapid temperature change and/or an increase in temperature, pressure, and/or surface stress as a result of being exposed to the heated, high-temperature steam. Sub-components such as non-return valve 114 may aid in the reduction of the thermal fatigue and/or stress experienced by HP component 24, rotor 26, and/or portions of ST system 18. The initial temperature of incoming heated steam may initially overstress rotor 26 and/or other portions of ST system 18 if it is not managed, e.g., using embodiments of the disclosure. Methods according to the disclosure thus may initially allow steam to be routed to LP and/or IP components 20, 22 before inlet valve 104 allows steam to enter HP component 24. Embodiments of the disclosure may cause control system 68 to predict the stress that will be imparted onto rotor 26 when inlet valve 104 is opened to its minimum load position, and may control the volume of steam initially routed through HP component 24 to warm and pressurize its interconnected components. At this point, HP component 24 extracts substantially less energy from the steam passing therethrough, as compared with the amount of energy extracted at "minimum load" flow. Once the predicted stress is below a threshold, inlet valve 104 is opened to its minimum load position. With steam flow to HP component 24 being in its minimum load position, HP component 24 mechanically drives rotor 26 to further extract energy from the steam.

Figure 3:
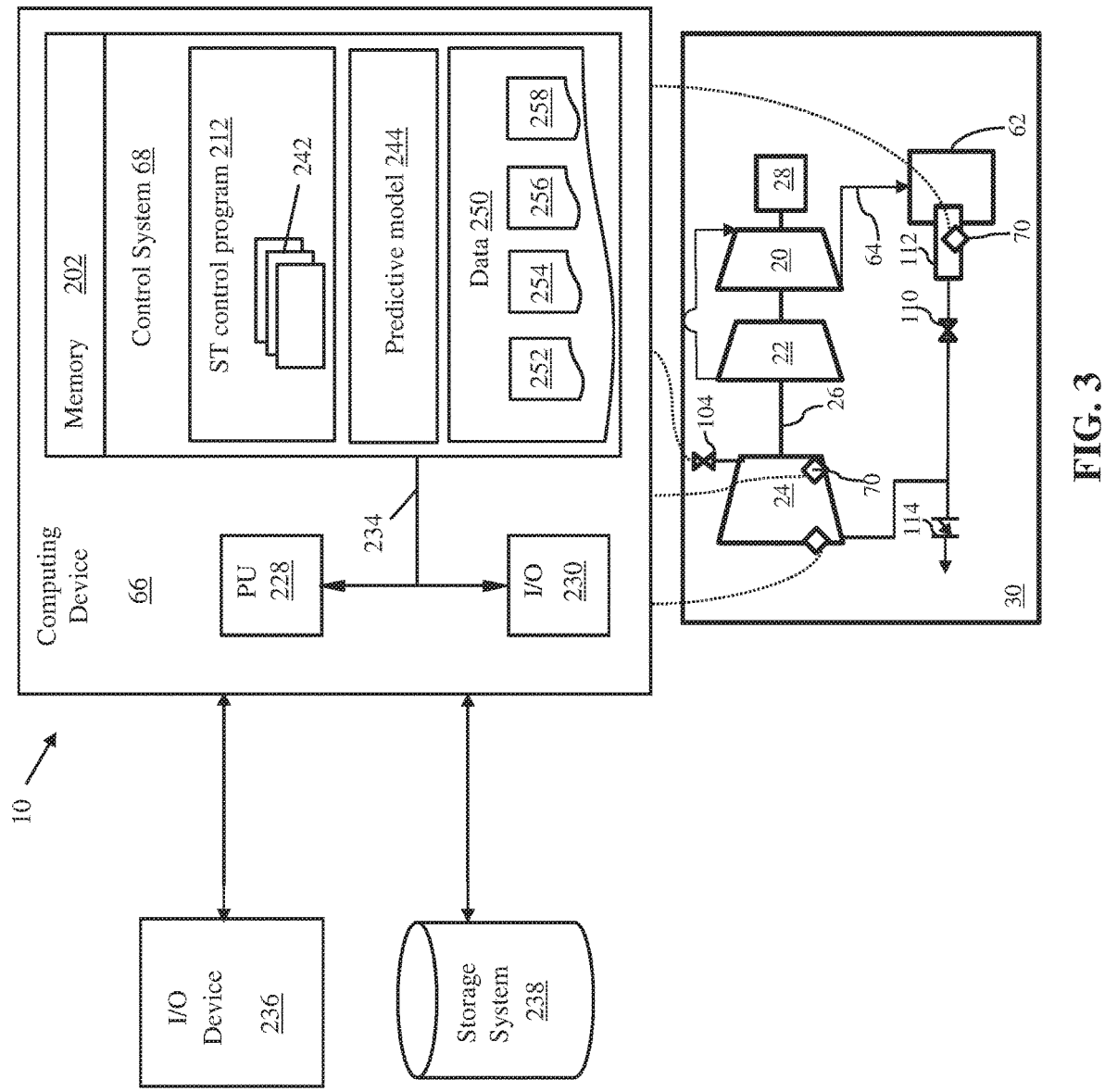
FIG. 3 shows an illustrative environment of a control system and subcomponents configured to interact with portions of the turbomachine according to embodiments of the disclosure.

Referring to FIG. 3, a schematic depiction of computing device 66 and sub-components thereof is illustrated as part of system 10. In the FIG. 3 illustration, only one ST system 18 is shown in detail, and the operative couplings between computing device 66 and various components of ST system 18 from FIG. 1 are shown only schematically in FIG. 3 for clarity of illustration. As shown, computing device 66 may include a memory 202 with control system 68 operating thereon. Control system 68 may be a software system integrated with portions (e.g., valve(s) 104, 110) of ST system 18, or otherwise in operative communication therewith. Control system 68 may include, e.g., a steam turbine (ST) control program 212. Turbine control program may cause computing device 66 to act on and/or modify ST system 18, and/or may modify an existing operational methodology of computing device 66 for operating ST system 18. Computing device 66 as shown in FIG. 3 represents one type of hardware for interacting with and/or controlling ST system 18. As discussed herein, computing device 66 may react to various monitored attributes of ST system 18 to ensure safe and reliable operation of system 10 during a startup operation. Within computing device 66, Turbine control program may monitor and/or interact with, and in some cases override, other operations that computing device 66 undertakes to control ST system 18 (e.g., adjusting of valves 104, 110, modifying the amount of steam directed through supply conduit(s) 58, etc.) during a startup operation.

According to an example, computing device 66 may control ST system 18 during a startup operation, and continuously evaluate whether to move valve(s) 104, 110 into various positions based on data measured via sensor(s) 70 and/or further values calculated via control system 68. Turbine control program may cause computing device 66 to predict the stress on rotor 26 when inlet valve 104 is moved into a minimum load position, and route smaller amounts of steam through HP component 24 to adjust the temperature and pressure within HP component 24 to reduce the predicted stress. Embodiments of the present disclosure may be configured or operated in part by a technician, computing device 66, and/or a combination of a technician and computing device 66. It is understood that some of the various components shown in FIG. 3 can be implemented independently, combined, and/or stored in memory for one or more separate computing devices that are included in computing device 66. Further, it is understood that some of the components and/or functionality may not be implemented, or additional schemas and/or functionality may be included as part of control system 68.

Computing device 66 can include a processor unit (PU) 228, an input/output (I/O) interface 230, memory 202, and a bus 234. Further, computing device 66 is shown in communication with an external I/O device 236 and a storage system 238. Control system 68 may provide Turbine control program, which in turn can operate using various modules 242 (e.g., a calculator, a determinator, a comparator, etc.) for implementing various functions and/or logical steps. The various modules 242 can use algorithm-based calculations, look up tables, and similar tools stored in memory 202 for processing, analyzing, and operating on data to perform their respective functions. In general, PU 228 can execute computer program code to run software, such as control system 68, which can be stored in memory 202 and/or storage system 238. While executing computer program code, PU 228 can read and/or write data to or from memory 202, storage system 238, and/or I/O interface 236. Bus 234 can provide a communications link between each of the components in computing device 66. I/O device 230 can comprise any device that enables a user to interact with computing device 66 or any device that enables computing device 66 to communicate with the equipment described herein and/or other computing devices. I/O device 230 (including but not limited to keyboards, displays, pointing devices, etc.) can be coupled to computing device 66 either directly or through intervening I/O controllers (not shown).

Memory 202 can also include various forms of data 250 pertaining to various components of system 10, e.g., various forms of data and/or predetermined data which computing device 66 may use as a reference to modify the operation of system 10. Turbine control program can store and interact with data 250 subdivided into various fields. For example, sensor data field 252 can store any and all types of data collected by sensor(s) 70 (e.g., inlet temperatures, outlet temperatures, measured rotor stresses, fluid flows, etc.), which may be used to monitor and control steam flow through HP component 24. Where applicable, sensor data field 252 may be divided into various sub-fields corresponding to particular types of data.

Data 250 may include one or more threshold values for various parameters, and such threshold values may be organized in a threshold data field 254. Threshold data field 254 may include, e.g., one or more stress thresholds representing a maximum tolerable stress on rotor 26. Calculating a predicted stress on rotor 26 above the threshold value(s) may cause computing device 66 to control the amount of steam flow through HP component 24. This, in turn, may reduce the predicted stress on rotor 26. The predicting of stress may occur before the steam intake to HP component 24 is increased (e.g., via inlet valve 104) to provide a minimum load. The threshold stress(es) in a threshold data field 254 may be calculated before methods of the disclosure begin (e.g., in process P0.3 (FIG. 5) discussed below), and may indicate a maximum allowable stress on rotor 26 when valve 104 is opened to a minimum load position. In some cases, the threshold(s) in threshold data field 254 may be calculated based on past operations of ST system 18, system 10, other similar ST systems and/or power generation systems, and/or may be analytical predictions. However calculated or derived, the thresholds for predicted stress may be stored in threshold data field 254 for reference by control system 68. Threshold data field 254 additionally may include boundaries for various safety parameters relating to the operation of a turbine component such as HP component 24. For instance, threshold data field 254 may include a maximum present stress on rotor 26 during a warming phase of the turbine component operation, maximum temperatures in outlet 108 corresponding to respective temperatures in bowl 106, and/or other data indicative of safe turbine component operation.

Data 250 may include a valve position field 256 for storing various valve positions for each valve 104, 110, and/or other components of system 10 for adjusting fluid flow (e.g., non-return valve 114) where applicable. Valve position field 256 may indicate partially-open positions for valve(s) 104, 110 which correspond to particular operating conditions. For example, valve position field 256 may include at least one partially-open positions for inlet valve 104 that is less than the minimum load position for inlet valve 104. Such a position for inlet valve 104 may be designated a "warming position," as it is used to increase the temperature within HP component 24 before a higher steam flow is admitted through inlet valve 104. Valve position field 256 may also include multiple partially-open or fully open positions that include the minimum load position, and/or positions that allow greater fluid flow than the minimum load position. During operation, control system 68 may cause inlet valve 104 to adjust between multiple warming positions that are less open than the minimum load position, until the predicted stress is less than corresponding threshold(s) within threshold data field 254.

In various implementations, it may be desirable to overestimate the predicted stress on rotor 26. Technical benefits of overestimating the predicted stress may include, e.g., ensuring that opening inlet valve 104 to the minimum load position does not impart significant damage to rotor 26 or HP component 24 during a startup operation of ST system 18. To deliberately overestimate the predicted stress, data 250 may include a biasing constant field 258 for storing a corrective adjustment to predicted stress(es) calculated via predictive model 244. Biasing constant field 258 may include an overcorrective adjustment to calculated stress(es), e.g., in the form of a constant to be added to the predicted stress. In further examples, biasing constant field 258 may take the form of a look-up table, algorithm, etc., for increasing the predicted stress by varying amounts by reference to the operation of ST system 18 and/or HP component 24. In such an example, a table in biasing constant field 258 may correlate a minimum load of, e.g., fifty megawatts (50 MW), a rotor surface temperature of three-hundred ° C., an inlet fluid temperature of three-hundred and fifty ° C., and a predicted steam flow of approximately forty kilograms per second (kg/s), with a biasing constant of five megapascals (MPa). The correlated biasing constant (e.g., five MPa in this example) can then be added to an initially-calculated predicted stress to create a final value of predicted stress. However organized, tabulated, etc., the biasing constant values in biasing constant field 258 may be user-defined (e.g., via I/O device 236), calculated via predictive model 244, and/or generated using a combination of user inputs and/or functions implemented via control system 68 or applicable subcomponents.

Computing device 66 can comprise any general purpose computing article of manufacture for executing computer program code installed by a user (e.g., a personal computer, server, handheld device, etc.). However, it is understood that computing device 66 is only representative of various possible equivalent computing devices and/or technicians that may perform the various process steps of the disclosure. In addition, computing device 66 can be part of a larger system architecture operable to model and/or control various aspects and elements of ST system 18.

To this extent, in other embodiments, computing device 66 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 66 may include a program product stored on a computer readable storage device, which can be operative to automatically control other elements of system 10 when executed. Computing device 66 may also take the form of, e.g., a remote monitoring system that is part of a central monitoring system, which in turn is responsible for monitoring several ST systems 18. In this case, computing device 66 may represent a portion or subcomponent of a central control system.

Figure 4:
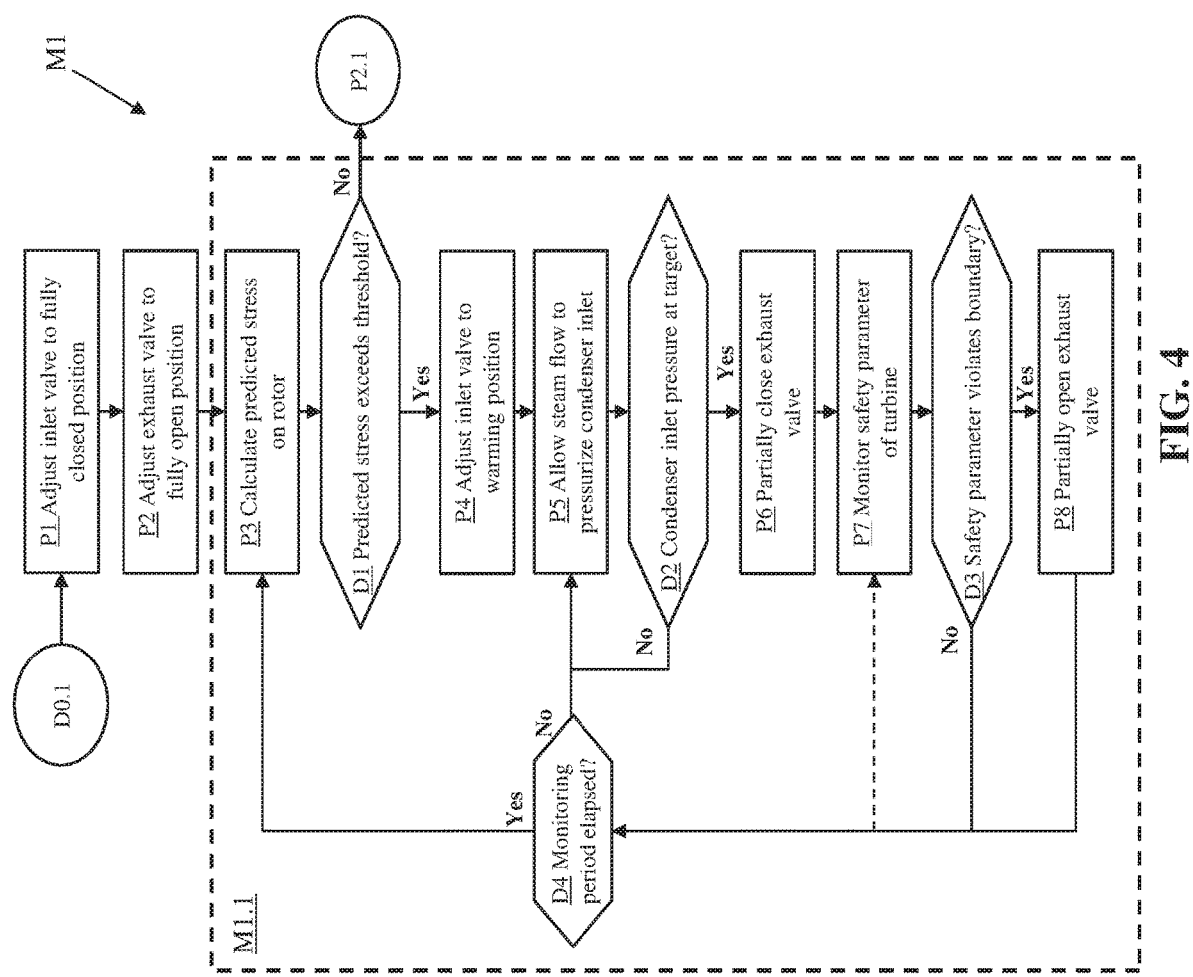
FIG. 4 provides an illustrative flow diagram of a method for controlling steam temperature within a turbomachine during startup operation, according to embodiments of the present disclosure.
Figure 5:
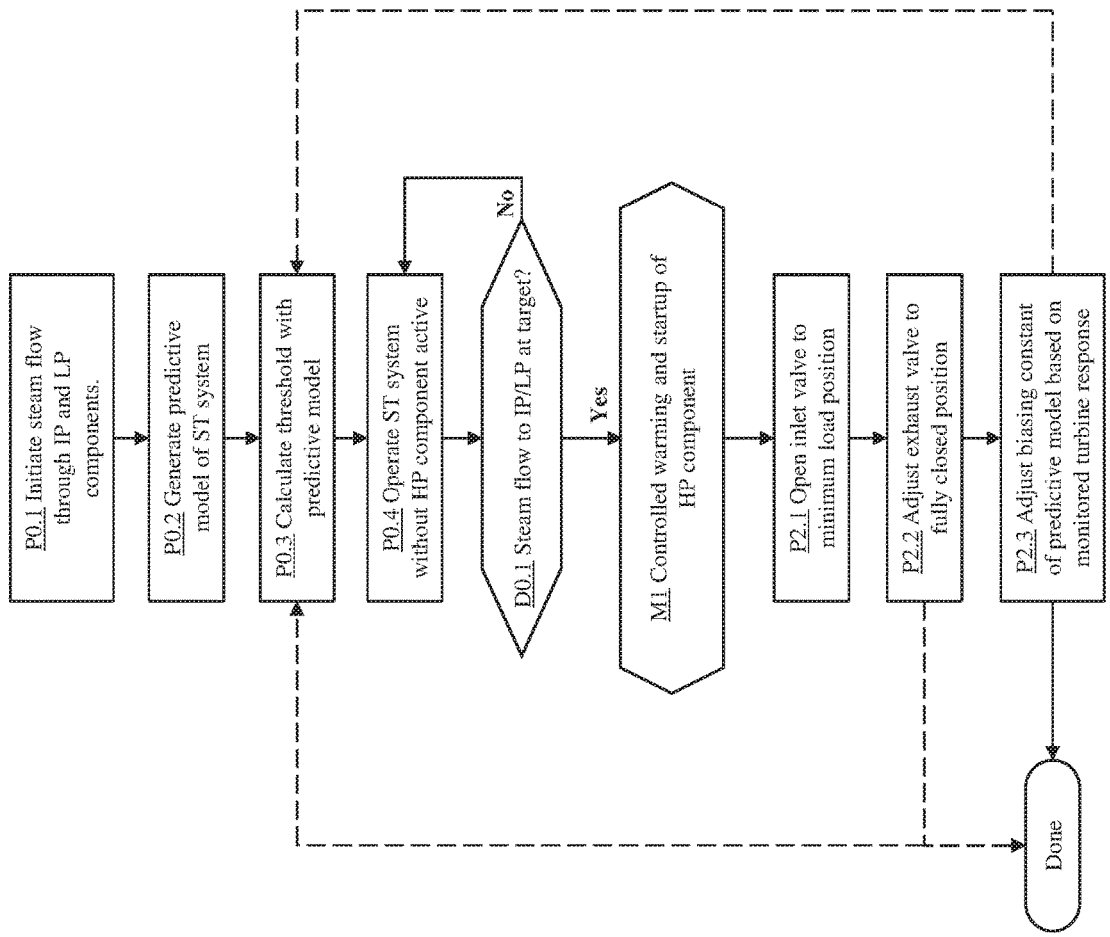
FIG. 5 provides an expanded flow diagram of processes for controlling steam temperature within a turbomachine during startup operation, according to embodiments of the present disclosure.

Referring now to FIGS. 3 and 4 together, an illustrative flow diagram for implementing a method M1 according to various embodiments of the disclosure is provided. Embodiments of the methodologies described herein may be implemented, e.g., using control system 68 of computing device 66, various modules and/or subcomponents of computing device 66 and/or control system 68. Method M1 according to the disclosure may also rely on other components such as sensor(s) 70 communicatively coupled to computing device 66 and/or control system 68 to measure and/or otherwise determine various parameters to be used as a basis for the processes discussed herein. As discussed herein, control system 68 may adjust various operational parameters of power generation system 12, e.g., by opening, closing, or otherwise adjusting the position of valve(s) 104, 110 to control the predicted stresses on rotor 26. In still further embodiments, control system 68 may be operable to modify other instructions and/or actions undertaken via computing device 66 and/or control system 68, e.g., by modifying a biasing constant for calculating the predicted stress on rotor 26. The illustrative flow diagram in FIG. 4 is shown with several processes organized in an example flow, but it is understood that one or more processes may be implemented simultaneously and/or sequentially, and/or executed in any alternative order while maintaining the various technical features described by example herein.

Referring now to FIGS. 1, 3, and 4 together, embodiments of the disclosure provide method M1 to control steam flow through a turbine component during a startup operation of a turbine system. The various methodologies provided herein are discussed by reference to ST system 18, and HP component 24 therein, for the sake of example. It is understood that embodiments of the disclosure may be implemented on other types of turbomachinery and/or turbine components with substantially no changes from the methodology or methodologies described herein. The methods discussed herein can be initiated by control system 68 of computing device 66 under particular conditions (e.g., detecting that HP component 24 has started operating), and/or may be implemented as part of a more general methodology for controlling HP component 24 as discussed elsewhere herein. Processes implemented in further embodiments, and/or as different control methods (i.e., decision D0.1 and process P2), are shown in FIG. 4 as examples and described in more detail with respect to other FIGS.

As noted herein, embodiments of the disclosure control steam pressure within HP component 24 of ST system 18 during a startup operation. The method includes process P1 of adjusting inlet valve 104 into a fully closed position (e.g., via mechanical couplings, electrical couplings, converters, etc., generally indicated by phantom lines between computing device 66 and inlet valve 104). To prevent premature steam flow into HP component 24 and ensuing stresses on rotor 26, control system 68 of computing device 66 may implement process P2 to adjust exhaust valve 110 into a fully open position (e.g., via mechanical couplings, electrical couplings, converters, etc., generally indicated by phantom lines between computing device 66 and exhaust valve 110). After processes P1 and P2 conclude and valve(s) 104, 110 are in their respective positions, existing fluids may be extracted from HP component 24, while incoming fluids must bypass HP component 24 due to the closure of inlet valve 104.

Following processes P1, P2, the method may proceed to process P3 in which modules 242 of Turbine control program, or in some cases predictive model 244, calculate a predicted stress on rotor 26. Process P3 may be an initial process for a sub-method M1.1, which may be implemented in a looping fashion until various technical conditions are satisfied as discussed herein. Sub method M1.1 generally may include steps for evaluating whether the predicted stress is below the threshold, and where applicable, adjusting valve(s) 104, 110 such that the predicted stress becomes less than the threshold. As noted herein, the predicted stress calculated in process P3 does not refer to the present stress on rotor 26 or a future stress with valve(s) 104, 110 remaining in their current position. Rather, the predicted stress calculated in process P2 refers to the immediate stress (measured, e.g., in MPa) by admitted steam on rotor 26 when inlet valve 104 is opened to its minimum load position (as defined, e.g., in valve position field 256 of data 250). In cases where predictive model 244 deliberately overestimates the predicted stress, process P2 may include adding a biasing constant to the predicted stress (as indicated, e.g., in biasing constant field 258). However implemented, process P2 may include using at least a surface temperature of rotor 26 and a steam temperature within inlet 102 (as measured or calculated, e.g., using sensor(s) 70 and/or derived from data 250 such as values in sensor data field 252) to calculate the predicted stress on rotor 26.

After calculating the predicted stress on rotor 26 in process P3, the method may proceed to decision D1 of determining (e.g., via modules 242 of Turbine control program) whether the predicted stress exceed a corresponding threshold for ST system 18 and/or its current operating conditions. Such thresholds may be stored, e.g., in threshold field 254 of data 250. In various implementations, modules 242 of ST control program 212 may select one of several thresholds (e.g., based on a user input, internal logic, look-up tables, and/or algorithms) for comparison with the predicted stress calculated in process P3. In cases where the predicted stress does not exceed the threshold (i.e., "No" at decision D1), method M1 may conclude and/or proceed to further operations (e.g., process P2.1 as shown as an example in FIG. 4). In cases where the predicted stress exceeds the threshold (i.e., "Yes" at decision D1), method M1 may proceed to subsequent operations for preparing HP component 24 for the admission of steam thereto.

In response to the predicted stress exceeding the threshold, sub-method M1.1 may include adjusting inlet valve 104 to a warming position that is less than the minimum load position for HP component 24. For example, warming position for inlet valve may be, configured to admit, e.g., ten percent of the available steam flow from supply conduit 58, as compared to a minimum load position which admits, e.g., twenty-five percent of the available steam flow. In the warming position, exhaust valve 110 remains fully open and non-return valve 114 may allow excess steam to be directed away from condenser 62 where desired and/or applicable. With inlet valve 104 in the warming position, incoming steam may impart some torque on rotor 26 without extracting significant energy, while also increasing the pressure within discharge passage 112.

After opening inlet valve 104 to the warming position in process P4, process P5 of sub-method M1.1 may include allowing the admitted steam flow through HP component 24 to pressurize discharge passage 112. The admitted steam, in particular, can apply pressure to the physical component(s) of discharge passage 112 (including, e.g., a dump tube to condenser 62) and thereby raise the total pressure. The admitted steam flow will also gradually raise the surface temperature of rotor 26 such that it is less susceptible to stress from incoming steam.

As incoming steam flows are allowed to pressurize discharge passage 112, method M1.1 may include decision D2 of comparing the pressure of discharge passage 112 with a target value. The target value may indicate that the pressure within discharge passage 112 is sufficient to allow pressurizing of HP component 24. The target value for discharge passage 112 pressure may be stored, e.g., in threshold field 252 or elsewhere in data 250. The measured pressure within discharge passage 112 may be obtained directly via sensor(s) 70 and/or may be calculated from other data 250 via modules 242. A startup operation of ST system 18 may require the pressure within HP component 24 to increase to further reduce stresses on rotor 26. The pressurizing of HP component 24 can proceed more effectively after discharge passage 112 is first pressurized. In cases where the pressure of discharge passage 112 has not reached its target (i.e., "No" at decision D2), the method may return to process P5 to allow further pressurizing of discharge passage 112. Decision D2 may repeat after a predetermined time delay, or may be implemented continuously. In cases where the pressure of discharge passage 112 has reached its target, i.e., "Yes" at decision D2), the method may proceed to process P6 of partially closing exhaust valve 110 while maintaining inlet valve 104 in the warming position. Process P6 will cause the total steam flow through HP component 24 to remain substantially the same, but the upstream pressure (i.e. the pressure within HP section 24) will increase.

Further analysis may include process P7 of monitoring one or more safety parameters of the turbine (e.g., HP component 24) to be compared with corresponding boundaries. The term "safety parameters," as used herein, refers to any quantity indicative of the current operating status of a turbine component, and/or the likelihood of HP component 24 to experience adverse effects. Examples of safety parameters, as discussed herein, may include the present or "actual" stress on rotor 26 (as distinguished from the predicted stress), predicted temperatures in outlet 108 based on the actual temperature in bowl 106, and/or similar properties. Predicted temperatures in outlet 108 may be particularly relevant, e.g., because too low of a steam flow through the HP component 24 may cause the rotating blades to impart energy into the steam rather than vice-versa thus raising the temperature at the turbine outlet to unacceptable levels. In decision D3, modules 242 of Turbine control program 212 can compare one or more of the safety parameters monitored in process P7 with their respective boundaries. The boundary(ies) for each safety parameter may be stored in threshold field 254 of data 250, or elsewhere in memory 202. According to one example, decision D3 may include comparing the present stress on rotor 26 (monitored, e.g., with sensor(s) 70) with a maximum allowable stress. In another example, decision D3 may include comparing the predicted temperature in outlet 108 with its desired maximum, based on the present temperature in bowl 106. In the case that the safety threshold does violates its boundary (i.e., "Yes" at decision D3), the method may include process P8 of partially opening exhaust valve 110 to return the monitored safety parameter(s) to desired ranges. In the case that the safety parameter does not violate the boundary (i.e., "No" at decision D3), the method may proceed to further steps. In some cases, the monitoring of safety parameters in process P7 and decision D3 may be implemented in a loop as indicated by the phantom line in FIG. 4.

The disclosure may additionally include a decision D4 of whether a monitoring period (e.g., a desired timespan, a user confirmation, and/or desired number of processing loops) has occurred. If the monitoring period has elapsed (i.e., "Yes" at decision D4), the method may return to process P3 of recalculating the predicted stress on the rotor. If further monitoring is needed (i.e., "No" at decision D4), the method may return to process P5 for further pressurization of the turbine component (e.g., HP component 24). If the predicted stress is now below the threshold (i.e., "Yes" at process D1), sub-method M1.1 may end. If the predicted stress remains above the threshold (i.e., "No" at process D2), processes P5, P6 and decision D2 may repeat with inlet valve 104 in the warming position but with a higher target pressure applied to discharge passage 112 and/or HP component 24.

Referring now to FIGS. 1 and 3-5, further operations may be implemented together with method M1 to provide further control of ST system 18. Method M1 is indicated via a single box in the flow diagram of FIG. 5, and it is understood that method M1 may include the various processes and decisions discussed herein with respect to FIG. 4. Although several processes are shown by example to occur before or after the implementation of method M1, it is understood that several operations may be re-ordered and/or omitted in various further embodiments.

Process P0.1 in various embodiments may include, e.g., initiating the operation of ST system 18 by initiating a steam flow through LP and IP components 20, 22 while preventing steam flow through HP component 24 (e.g., by completely closing inlet valve 104 thereto). Such a configuration may be limited to, e.g., ST system 18 configurations with a "cascading bypass" to control steam flow through components 20, 22, 24. As process P0.1 concludes, HP component 24 may remain dormant and thus does not drive movement of rotor 26.

Process P0.2 of the disclosure may include generating predictive model 244 of ST system 18. Predictive model 244 may be generated based on, e.g., various information within data 250 such as recorded data in sensor data field 252, operational settings of ST system 18, and/or other inputs. Predictive model 244 may take the form of a generalized formula, algorithm, look-up table, etc., for predicting stresses on rotor 26 based on the operating conditions of ST system 18. According to a specific example, predictive model 244 may be configured to generate a predicted stress on rotor 26 using a surface temperature of rotor 26, a steam temperature within inlet 102 to HP component 24, one or more biasing constants such as those recorded in biasing constant field 258 of data 250, and/or any other data pertaining to the operation of system 10. The generating of predictive model 244 in process P0.2 may be a single operation performed before, after, or simultaneously with other processes discussed herein. In further examples, the generating of predictive model 244 may be continuous and may incorporate additional readings from sensor(s) 70 to calculate the predicted stress on rotor 26 for when inlet valve 104 is adjusted to a minimum load position.

After or during the generating of predictive model 244 in process P0.2, the method may include process P0.3 of calculating the threshold for rotor stress, to be used in decision D1 (FIG. 4) of method M1. The calculated threshold may be stored, e.g., in threshold field 254 for future reference, and/or may be continuously updated as ST system 18 continues to operate. In any case, process P0.3 may include predictive model 244 of control system 68 using the current operating conditions of system 10 (e.g., surface temperature of rotor 26, steam temperature within inlet 102 to HP component 24, one or more biasing constants such as those recorded in biasing constant field 258 of data 250, and/or any other data pertaining to the operation of system 10) to yield the threshold to be compared with predicted stress in decision D1.

Embodiments of the disclosure may continue by operating ST system 18 without HP component 24 being active, i.e., no steam enters HP component 24 because inlet valve 104 remains closed. In this case, LP and IP components 20, 22 will continue to operate and mechanically drive the rotation of rotor 26. As ST system 18 continues to operate without HP component 24 being active, modules 242 of control system 68 may determine whether the steam flow to LP and IP components 20, 22 has reached a target level. The target steam flow to LP and IP components 20, 22 may be manually selected via a user of control system 68, and/or may be stored within data 250 (e.g., as part of sensor data field 252 and/or alternatively as part of threshold filed 254). Decision D0.1 in embodiments of the disclosure can evaluate whether the steam flow through LP and IP components 20, 22 has reached its target. Where the steam flow through LP and IP components 20, 22 is below the target (i.e., "No" at decision D0.1), ST system 18 can continue operate without steam flow being admitted HP component 24 (i.e., inlet valve 104 remains in a closed position). Where the steam flow through LP and IP components 20, 22 is at or above the target (i.e., "Yes" at decision D0.1), the various processes of method M1, discussed elsewhere herein, can begin. As indicated in FIG. 4, process P1 of adjusting exhaust valve 110 to a fully open position can follow decision D0.1 in an example implementation. Method M1 thus can be implemented in full, with sub-method M1.1 where applicable, to determine whether the predicted stress on rotor 26 is below the applicable threshold. Once the predicted stress on rotor 26 is determined to be less than the threshold (i.e., method M1 concludes), the further operations may be implemented.

After method M1 concludes, and the predicted stress is below the threshold, further operations may include process P2.1 of opening inlet valve 104 to the minimum load position. The minimum load position may be defined in valve position field 256 of data 250. Through one or more operative couplings between computing device 66 and inlet valve 104 (e.g., electrical connections, mechanical converters, etc.), inlet valve 104 may be adjusted to at least the minimum load position, thereby allowing steam to enter HP component 24 and mechanically drive rotation of rotor 26. The adjusting of inlet valve 104 will impart stress onto rotor 26, but the imparted stress will be significantly less than conventional operations where method M1 is omitted.

Continuing to process P2.2, ST system 18 may continue admitting steam into HP component 24 through inlet valve 104. Once inlet valve 104 is at its minimum load position, control system 68 may adjust exhaust valve 110 to a closed position. The adjusting of exhaust valve 110 may be implemented, e.g., via mechanical connections, mechanical converters, etc., between computing device 66 and exhaust valve 110. With exhaust valve 110 in the closed position, fluids within outlet 108 may continue to flow through non-return valve 114 to a reheater component as discussed elsewhere herein. At this stage, HP component 24 has ceased to operate in a "startup" mode and has begun producing at least a minimum load via rotor 26. In some cases, the method may conclude ("Done") after the adjusting of exhaust valve 110 to a fully closed position, as indicated by phantom lines in FIG. 5. In a further example, the method may return to process P0.3 at any point where system 10 re-initiates a startup operation, e.g., by ceasing to operate for a set time and/or transitioning to a different type of operating mode.

In various implementations, control system 68 can use the operating characteristics of system 10 to modify the calculating of a threshold in process P0.3 in further implementations. For example, in the case where predictive model 244 deliberately overestimates the predicted stress via a biasing constant, process P2.3 may calculate a difference between the actual stress on rotor 26 with the predicted stress. The calculated difference may be expressed, e.g., in terms of a percentage, MPa difference, etc. In some cases, the biasing constant may be further adjusted based on, e.g., a startup temperature of HP component 24 (e.g., as measured with sensor(s) 70), a pressure profile of ST system 18 (e.g., the pressure within each component 20, 22, 24) with inlet valve 104 in the warming position, and/or other operational characteristics. Predictive model 244 then may use the difference to adjust a biasing constant for the predicted stress, e.g., by recalculation or adjusting various attributes of an algorithm, look-up table, etc. The adjusted biasing constant can be stored as data 250, e.g., within biasing constant field 258. The method may then conclude ("Done"), or may return to process P0.3 of calculating a threshold for predicted stress using the adjusted biasing constant.

Technical effects of the embodiments described herein include predicting the stress incoming steam flow to a high pressure component of a steam turbine will inflict on a rotor for driving a generator. When the predicted stress exceeds a desired level, technical effects of the disclosure ensure pre-heating and pre-pressurizing the high pressure component before more steam is admitted to the high pressure component to drive a rotor. Further technical effects of the embodiments discussed herein include using the actual stress on the rotor in a particular operation as training data to predict how future steam flows will impart stress on the same rotor in future operations, or on similar rotors in other steam turbine systems.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for controlling steam pressure within a turbine component during a startup operation, the turbine component being fluidly coupled between an inlet having an inlet valve for controlling steam flow into the turbine component and an exhaust having an exhaust valve for controlling steam flow to a discharge passage, the method comprising:
   adjusting the exhaust valve to a fully open position and the inlet valve to a fully closed position;
   calculating a predicted stress on a rotor of the turbine component based on a predicted steam flow with the inlet valve in a minimum load position, a rotor surface temperature, and an inlet steam temperature;
   determining whether the predicted stress exceeds a threshold;
   in response to the predicted stress exceeding the threshold, adjusting the inlet valve to a warming position that is less open than the minimum load position, such that a steam flow through the turbine component pressurizes the discharge passage;
   in response to steam in the discharge passage reaching a target pressure, partially closing the exhaust valve while maintaining the warming position of the inlet valve;
   determining whether a safety parameter of the turbine component violates a boundary, while maintaining the warming position of the inlet valve;
   in response to the safety parameter of the turbine component violating the boundary, partially opening the exhaust valve while maintaining the warming position of the inlet valve;
   recalculating the predicted stress on the rotor with the inlet valve in the warming position; and
   in response to the predicted stress not exceeding the threshold, opening the inlet valve to at least the minimum load position.

2. The method of claim 1, wherein the safety parameter of the turbine component includes an actual stress on rotor with the inlet valve in the warming positon, and wherein the boundary includes a stress limit for the rotor.

3. The method of claim 1, wherein the safety parameter includes a predicted steam temperature drop across the turbine component, based on an upstream steam temperature, and wherein the boundary includes a minimum steam temperature for an outlet from the turbine component.

4. The method of claim 1, wherein the turbine component comprises a high pressure (HP) component of a steam turbine (ST) system, and wherein the method further comprises:

initiating a steam flow through an intermediate pressure (IP) component and a low pressure (LP) component of the ST system, before calculating the predicted stress on the rotor, determining whether the steam flow through the IP component and the LP component of the ST system reaches a target level; and in response to the steam flow through the IP component and the LP component reaching the target level, calculating the predicted stress on the rotor.

5. The method of claim 1, further comprising adjusting the exhaust valve to a fully closed position after opening the inlet valve to at least the minimum load position.

6. The method of claim 1, further comprising generating a predictive model for the turbine component to calculate the predicted stress based on at least the rotor surface temperature, the inlet steam temperature, and a biasing constant, before adjusting the exhaust valve to the fully open position and the inlet valve to the fully closed position.

7. The method of claim 6, further comprising adjusting the biasing constant of the predictive model, based on a startup temperature of the turbine component, and a pressure profile of the turbine component with the turbine component with the inlet valve in the warming position after reducing the steam flow through the exhaust valve.

8. A program product stored on a computer readable storage medium for controlling steam pressure within a turbine component during a startup operation, the turbine component being fluidly coupled between an inlet having an inlet valve for controlling steam flow into the turbine component and an exhaust having an exhaust valve for controlling steam flow to a discharge passage, the computer readable storage medium comprising program code for causing a computer system to perform actions including:

adjusting the exhaust valve to a fully open position and the inlet valve to a fully closed position;

calculating a predicted stress on a rotor of the turbine component based on a predicted steam flow with the inlet valve in a minimum load position, a rotor surface temperature, and an inlet steam temperature;

determining whether the predicted stress exceeds a threshold;

in response to the predicted stress exceeding the threshold, adjusting the inlet valve to a warming position that is less open than the minimum load position, such that a steam flow through the turbine component pressurizes the discharge passage;

in response to steam in the discharge passage reaching a target pressure, partially closing the exhaust valve while maintaining the warming position of the inlet valve;

determining whether a safety parameter of the turbine component violates a boundary, while maintaining the warming position of the inlet valve;

in response to the safety parameter of the turbine component violating the boundary, partially opening the exhaust valve while maintaining the warming position of the inlet valve;

recalculating the predicted stress on the rotor with the inlet valve in the warming position; and in response to the predicted stress not exceeding the threshold, opening the inlet valve to at least the minimum load position.

9. The program product of claim 8, wherein the safety parameter of the turbine component includes an actual stress on rotor with the inlet valve in the warming positon, and wherein the boundary includes a stress limit for the rotor.

10. The program product of claim 8, wherein the safety parameter includes a predicted steam temperature drop across the turbine component, based on an upstream steam temperature, and wherein the boundary includes a maximum steam temperature for an outlet from the turbine component.

11. The program product of claim 8, wherein the turbine component comprises a high pressure (HP) component of a steam turbine (ST) system, and further comprising program code for:

initiating a steam flow through an intermediate pressure (IP) component and a low pressure (LP) component of the ST system, before calculating the predicted stress on the rotor, determining whether the steam flow through the IP component and the LP component of the ST system reaches a target level; and in response to the steam flow through the IP component and the LP component reaching the target level, calculating the predicted stress on the rotor.

12. The program product of claim 8, further comprising program code for adjusting the exhaust valve to a fully closed position after opening the inlet valve to at least the minimum load position.

13. The program product of claim 8, further comprising program code for generating a predictive model for the turbine component to calculate the predicted stress based on at least the rotor surface temperature, the inlet steam temperature, and a biasing constant, before adjusting the exhaust valve to the fully open position and the inlet valve to the fully closed position.

14. The program product of claim 13, further comprising program code for adjusting the biasing constant of the predictive model, based on a startup temperature of the turbine component, and a pressure profile of the ST system with the turbine component with the inlet valve in the warming position after reducing the steam flow through the exhaust valve.

15. A turbine system comprising:

a turbine component fluidly coupled between an inlet having an inlet valve for controlling steam flow into the turbine component and an exhaust having an exhaust valve for controlling steam flow to a discharge passage;

a control system operatively coupled to the inlet valve and the exhaust valve of the turbine component, wherein the control system performs actions including:

adjust the exhaust valve to a fully open position and the inlet valve to a fully closed position;

calculate a predicted stress on a rotor of the turbine component based on a predicted steam flow with the inlet valve in a minimum load position, a rotor surface temperature, and an inlet steam temperature;

determine whether the predicted stress exceeds a threshold;

in response to the predicted stress exceeding the threshold, adjust the inlet valve to a warming position that is less open than the minimum load position, such that a steam flow through the turbine component pressurizes the discharge passage;

in response to steam in the discharge passage reaching a target pressure, partially close the exhaust valve while maintaining the warming position of the inlet valve;

determine whether a safety parameter of the turbine component violates a boundary, while maintaining the warming position of the inlet valve;

in response to the safety parameter of the turbine component violating the boundary, partially open the exhaust valve while maintaining the warming position of the inlet valve;

recalculate the predicted stress on the rotor with the inlet valve in the warming position; and in response to the predicted stress not exceeding the threshold, open the inlet valve to at least the minimum load position.

16. The turbine system of claim 15, wherein the safety parameter of the turbine component includes an actual stress on rotor with the inlet valve in the warming position, and wherein the boundary includes a stress limit for the rotor.

17. The turbine system of claim 15, wherein the safety parameter includes a predicted steam temperature drop across the turbine component, based on an upstream steam temperature, and wherein the boundary includes a minimum steam temperature for an outlet from the turbine component.

18. The turbine system of claim 15, the control system is further configured to generate a predictive model for the turbine system to calculate the predicted stress based on at least the rotor surface temperature, the inlet steam temperature, and a biasing constant, before adjusting the exhaust valve to the fully open position and the inlet valve to the fully closed position.

19. The turbine system of claim 18, wherein the control system is further configured to adjust the biasing constant of the predictive model, based on a startup temperature of the turbine component, and a pressure profile of the turbine system with the turbine component with the inlet valve in the warming position after reducing the steam flow through the exhaust valve.

20. The turbine system of claim 18, wherein the control system is further configured to calculate the threshold using the predictive model, based on operating conditions of the turbine system.

* * * * *